United States Patent [19]

Kobayashi

[11] Patent Number: 4,677,748
[45] Date of Patent: Jul. 7, 1987

[54] HAND-OPERATED CABLE CUTTER

[75] Inventor: Mituharu Kobayashi, Sanjo, Japan

[73] Assignee: Kobayashi Tools Mfg. Co., Ltd., Niigata, Japan

[21] Appl. No.: 943,939

[22] Filed: Dec. 9, 1986

[30] Foreign Application Priority Data

Dec. 20, 1985 [JP] Japan .............................. 60-287564

[51] Int. Cl.$^4$ ............................................. B26B 13/00
[52] U.S. Cl. ........................................ 30/250; 30/192; 30/251
[58] Field of Search ................ 30/250, 251, 252, 191, 30/192, 92; 81/314, 325, 366

[56] References Cited

U.S. PATENT DOCUMENTS

| 2,861,490 | 11/1958 | Rozmus | 81/314 X |
| 2,861,491 | 11/1958 | Rozmus | 81/314 X |
| 3,210,844 | 10/1965 | Tontscheff | 30/192 X |
| 4,178,682 | 12/1979 | Sadavskas | 30/250 |
| 4,378,636 | 4/1983 | Wick | 30/250 X |

Primary Examiner—E. R. Kazenske
Assistant Examiner—Willmon Fridie, Jr.
Attorney, Agent, or Firm—Wenderoth, Lind & Ponack

[57] ABSTRACT

A hand-operated cable cutter includes a stationary cutter blade having a first curved jaw and a first cutting edge, a movable cutter blade having a second curved jaw and a second cutting edge, gear teeth provided on the movable cutter blade, a drive mechanism, a stationary handle having a distal end secured to the stationary cutter blade, and a swing handle having a distal end mounted pivotally relative to the stationary cutter blade and stationary handle. The movable cutter blade is pivotally connected to the stationary cutter blade. The drive mechanism comprises a pinion kept in engagement with the gear teeth, a ratchet wheel mounted concentrically with and for rotation with the pinion, a knob connected to the pinion, a driving pawl pivotally connected to the swing handle and kept engageable with the ratchet wheel to rotate the ratchet wheel in one direction, and a detent pawl kept in engagement with the ratchet wheel to prevent the ratchet wheel from being rotated in the opposite direction. When the driving pawl and the detent pawl are disengaged from the ratchet wheel by an action of the swing handle, the ratchet wheel and the pinion can freely be rotated, thereby allowing the second cutting edge to be moved either away from or toward the first cutting edge by the use of the knob.

9 Claims, 6 Drawing Figures

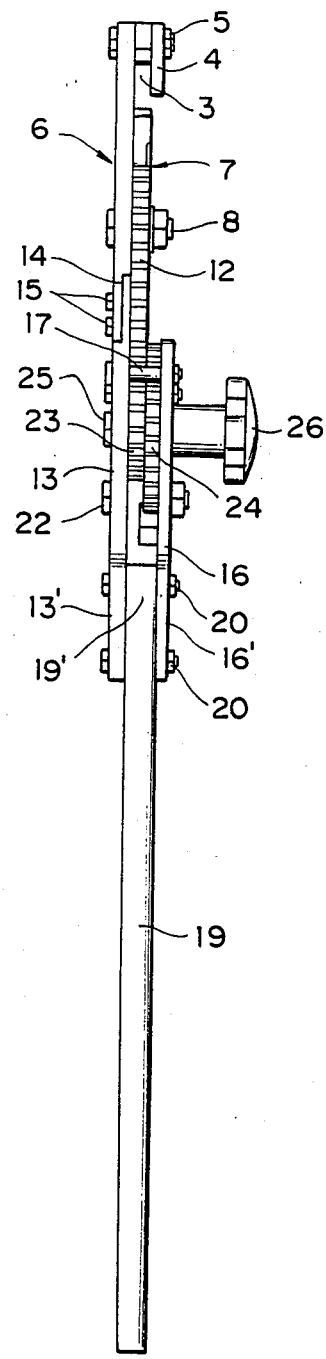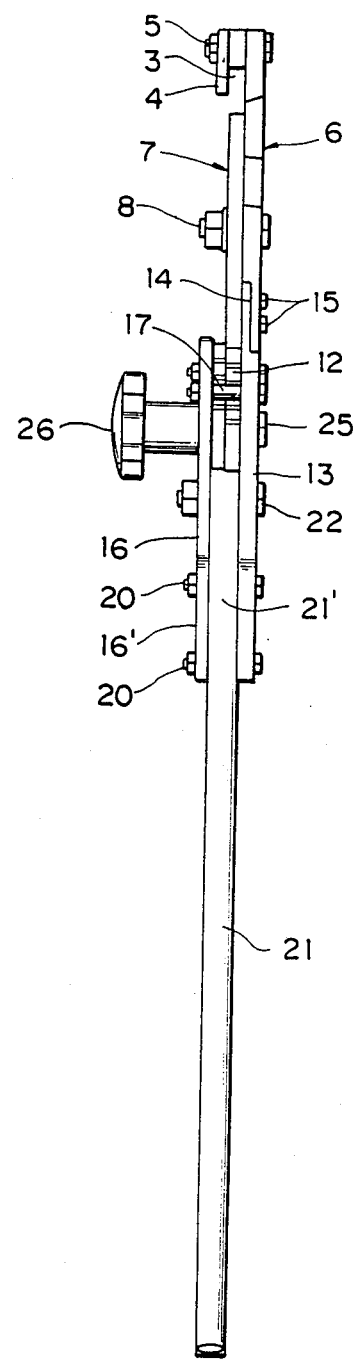

HAND-OPERATED CABLE CUTTER

FIELD OF THE INVENTION AND RELATED ART STATEMENT

The present invention relates to a hand-operated cable cutter for cutting metallic strands such as wire ropes, electric wires, communications lines, reinforcing bars and the like (hereinafter referred to collectively as "cable") in situ by a manual operation.

U.S. Pat. No. 3,084,432 discloses a hand-operated cable cutter of the type having a pair of jaws which are pressed together to operate on a workpiece to be cut and utilizing a chain-and-sprocket drive mechanism which is actuated by two levers swingable relative to each other in the same manner as the handles of a pair of tongs. The jaws are spread by opening the two levers and closed on the workpiece by closing the levers. With this prior art chain-and-sprocket type cable cutter, however, a large force is required to open the levers so as to spread the jaws to receive therebetween a workpiece to be cut. In addition, the widely spread levers make it difficult to apply an operator's arm force to the levers for closing the same to perform the cutting operation, with the workpiece clamped between the jaws. Furthermore, there are a number of disadvantages such that a noise produced during the operation, particularly during the opening of the levers, is so loud that it constitutes a nuisance to the environment, that engagement between the chain and the teeth of the sprocket becomes inaccurate due to deformation or twisting of the chain caused by impacts, and that the chain becomes loose and slack due to repeated use. Generally, there are provided various cutters such as of hydraulically-operated, jack-operated, electrically-operated and hand-operated types suitable for use on the various kinds of materials to be cut. Thus, users are required to keep various types of cutters in store depending upon the kind of material to be cut and object of use.

OBJECT AND SUMMARY OF THE INVENTION

One object of the present invention is to provide a universal hand-operated cable cutter with which an operator can easily and quickly apply the cutting edges to a workpiece to be cut and can perform the cutting operation readily in a comfortable posture after the workpiece has been clamped between the cutting edges.

Another object of the present invention is to provide a hand-operated cable cutter which is so noiseless in operation as to eliminate nuisance to the environment and which is so robust in construction that satisfactory performance of the tool may be maintained even when it is subjected to more or less rough handling and even after repeated use.

To attain the objects described above, according to the present invention, there is provided a hand-operated cable cutter comprising a first stationary cutter blade having a first curved jaw which is formed along its one lateral side with a first cutting edge; a second movable cutter blade having a second curved jaw which is formed along its one lateral side with a second cutting edge in an opposing relation with the first cutting edge, the movable cutter blade being pivotally connected to the stationary cutter blade for swinging and sliding movement relative to the stationary cutter blade; gear teeth provided on the movable cutter blade; a drive mechanism including a small gear kept in engagement with the gear teeth, a large ratchet wheel mounted concentrically with and for rotation with the small gear, a knob connected to the small gear, a driving pawl held engageable with the ratchet wheel to rotate the latchet wheel in one direction, and a detent pawl kept in engagement with the ratchet wheel to prevent rotation of the ratchet wheel in the opposite direction; a first stationary handle having a distal end portion to which the sationary cutter blade is secured; and a second swing handle having a distal end portion mounted pivotally relative to the first cutter blade and stationary handle, with the driving pawl pivotally connected thereto so that pumping strokes of the swing handle relative to the stationary handle cause the driving pawl to rotate the ratchet wheel and hence the small gear in the aforementioned one direction to thereby close the second cutting edge relative to the first cutting edge for performing the cutting operation on a workpiece to be cut and, when the driving pawl and detent pawl are disengaged from the ratchet wheel, free rotation of the ratchet wheel and the small gear being permitted to allow the second cutting edge to be moved either away from or toward the first cutting edge by the use of the knob.

The above and other objects, characteristic features and advantages of the present invention will become more apparent to those skilled in the art as the disclosure is made in the following description of a preferred embodiment of the invention, as illustrated in the accompanying drawings.

BRIEF DESCRIPTION OF THE DRAWINGS

FIG. 3 is a left side view of the same embodiment.

FIG. 4 is a right side view of the same embodiment.

DETAILED DESCRIPTION OF THE PREFERRED EMBODIMENT

Figure 1:
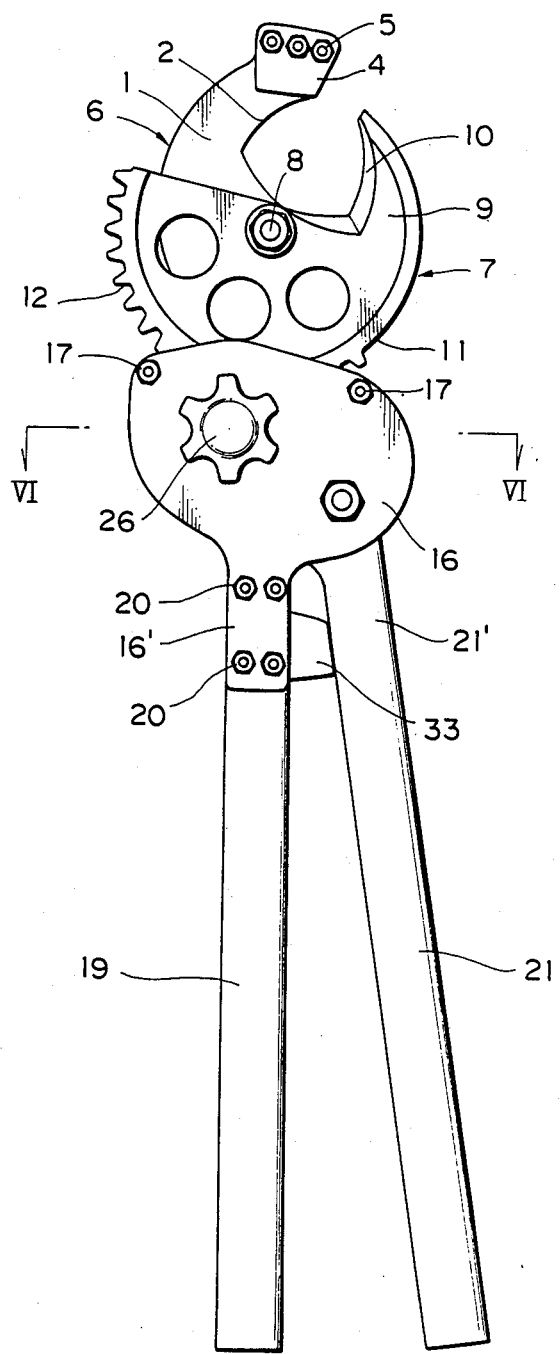
FIG. 1 is a front view illustrating one embodiment of the hand-operated cable cutter according to the present invention.
Figure 2:
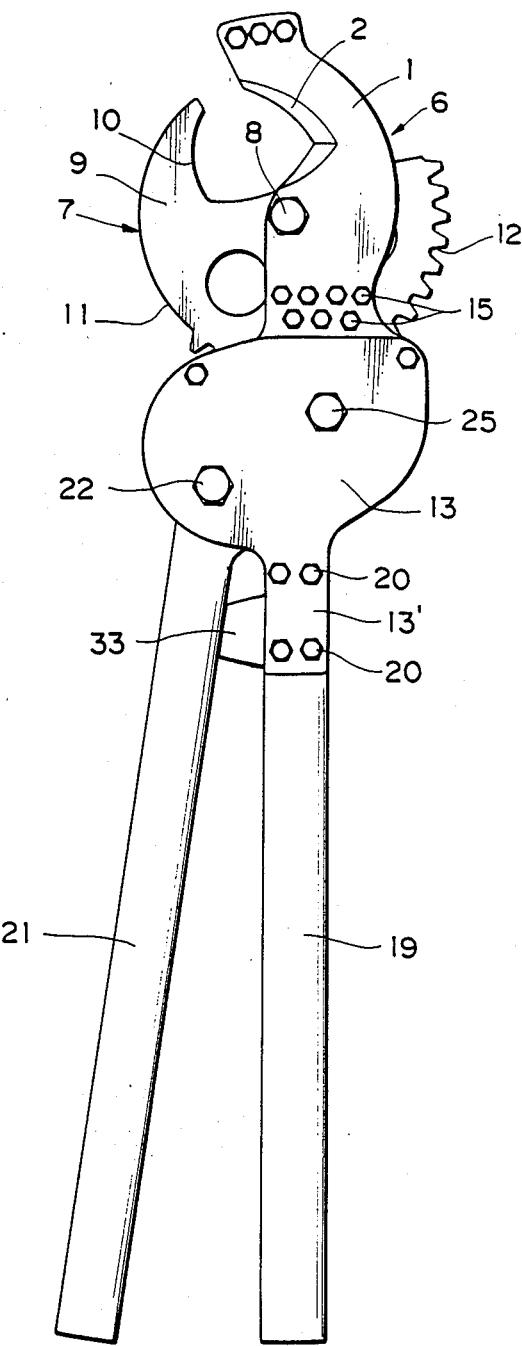
FIG. 2 is a rear view of the same embodiment.

Referring to the accompanying drawings, one mebodiment of the hand-operated cable cutter according to the invention will now be described. The cable cutter has a stationary cutter blade 6 having a first curved jaw 1 which is formed along its one lateral side with a first cutting edge 2. A second movable cutter blade 7 is pivotally connected to the first stationary cutter blade 6 at a position adjacent to the proximal end of the first cutting edge 2 by fastening means such as a bolt 8 for swinging and sliding movement relative to the stationary cutter blade 6. The second movable cutter blade 7 has a second curved jaw 9 which is formed along its one lateral side with a second cutting edge 10 and an arcuate peripheral surface 11. Gear teeth 12 are formed around at least a portion of the arcuate peripheral surface 11.

In the illustrated embodiment, the stationary cutter blade 6 is formed in its proximal end portion with a recess 14 for receiving the distal end portion of a drive mechanism mounting plate 13 in an overlapping relation. The distal end portion of the mounting plate 13 is fastened to the recess 14 of the stationary cutter blade 6 by bolts 15.

A cover plate 16 is disposed in a spaced-apart and facing relation with the mounting plate 13 and secured to the mounting plate 13 by spacer pins 17. The distal end portion 19' of a first stationary handle 19 is sandwiched between and fixed to proximal extensions 13' and 16' of the mounting plate 13 and cover plate 16, respectively by means of bolts 20.

Disposed between and pivotally connected to the plates 13 and 16 by a pivot pin 22 is a distal end portion 21' of a second swing handle 21.

Figure 5:
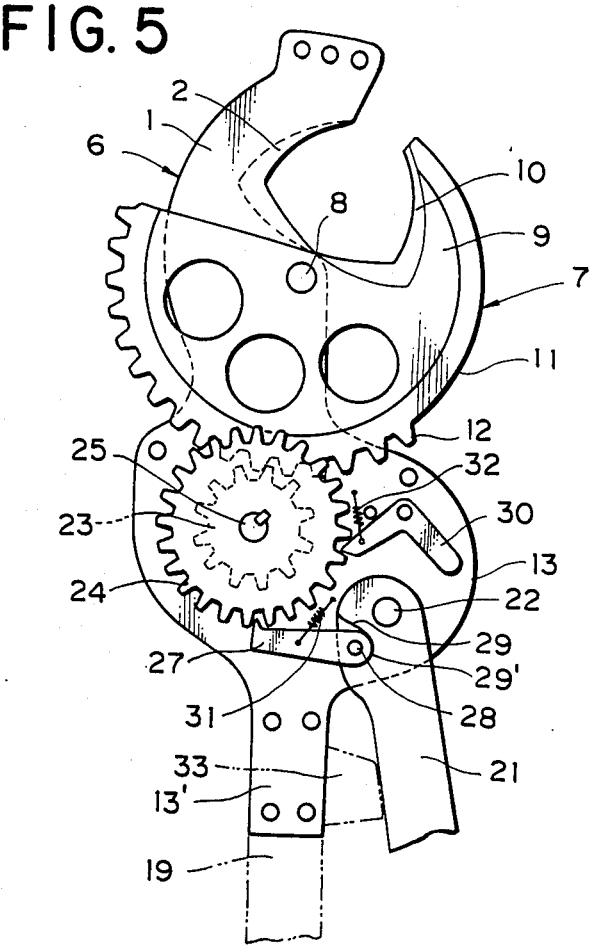
FIG. 5 is a fragmentary front view of the same embodiment, with a cover plate removed to show an interior drive mechanism.
Figure 6:
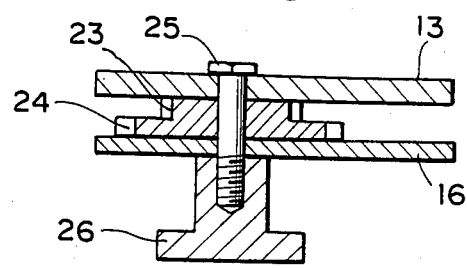
FIG. 6 is an end view of the same embodiment taken along line VI—VI in FIG. 1.

Mounted between the plates 13 and 16 are a small gear or pinion 23 meshing with the gear teeth 12 of the stationary cutter blade 6 and a large ratchet wheel 24 concentric with the small gear 23. The small gear 23 and large ratchet wheel 24 are keyed to a shaft 25 journalled in the plates 13 and 16. Secured to the end of the shaft 25 extending outwardly beyond the cover plate 16 is a knob 26 for the purpose to be explained hereinafter. A driving pawl 27 is pivotally connected to the distal end portion 21' of the swing handle 21 by a pin 28 and is engageable with the ratchet wheel 24 to drive the same in one direction. The distal end portion 21' of the swing handle 21 is formed with a recess where the driving pawl 27 is pivotally mounted, the recess defining a backup surface 29' and an abutment surface 29 between which the driving pawl 27 is permited to pivot. As shown in FIG. 5, the backup surface 29' cooperates with the pin 28 to force the driving pawl 27 to rotate the ratchet wheel 24 as the swing handle 21 is swung toward the stationary handle 19 in its swinging or pumping strokes about the pivot pin 22. When the swing handle 21 is opened wide beyond a predetermined angle, the abutment surface 29 abuts against the side wall of the driving pawl 27 to pivot the hooked end of the driving pawl 27 out of engagement with the ratchet wheel 24 to permit free rotation of the ratchet wheel 24. The driving pawl 27 is biased into engagement with the ratchet wheel 24 by a spring 31. A detent pawl 30 is pivoted to the mounting plate 13 and is biased into engagement with the ratchet wheel 24 by a spring 32 to prevent reverse rotation of the ratchet wheel 24.

A stop member 33 is secured to the distal end portion 19' of the stationary handle 19 to limit the closing movement of the swing handle 21 toward the stationary handle 19 to thereby protect the hand grasping the swing handle 21 from being pinched between the handles 19 and 21.

In use, the operator opens the swing handle 21 beyond the predetermined angle to move the driving pawl 27 out of engagement with the ratchet wheel 24. Since the swing handle 21 is opened beyond the predetermined angle to disengage the driving pawl 27 from the ratchet wheel 24, the distal end portion 21' of the swing handle 21 abuts against the detent pawl 30 to pivot the detent pawl 30 out of engagement with the ratchet wheel 24 against the biasing force of the spring 32 to permit free rotation of the ratchet wheel 24 in either the clockwise direciton or the counterclockwise direction. Then, the knob 26 may be turned to rotate the small gear 23 which in turn rotates the movable cutter blade 7 at a reduced rate by means of the gear teeth 12 to move the seocnd cutting edge 10 either away from or toward the first cutting edge 2. Initially, the knob 26 is turned in such a direction as to move the second cutting edge 10 away from the first cutting edge 2 to open the first and second cutting edges wide enough to accommodate therebetween a workpiece to be cut. If the workpiece to be cut is long, it may be inserted through the mouth opened between the distal ends of the first and second cutting edges. The knob 26 may then be turned back in the reverse direction to clamp the workpiece between the two cutting edges. The cable cutter is now ready for the cutting operation on the workpiece.

The operator then swings the swing handle 21 toward the stationary handle 19 to engage the driving pawl 27 with the ratchet wheel 24. Further, the closing movement of the swing handle 21 causes the driving pawl 27 to rotate the ratchet wheel 24 and the pinion (small gear) 23 in one direction. The pinion 23 in turn rotates the movable cutter blade 7 in the opposite direction at a reduced rate. As a result, the second cutting edge 10 of the movable cutter blade 7 is moved toward the first cutting edge 2 of the stationary cutter blade 6 to force the cutting edges 2 and 10 into the workpiece to be cut.

Then, as the swing handle 21 is moved away by an appropriate angle from the stationary handle 19, the driving pawl 27 is moved back over a few teeth of the ratchet wheel 24 through an idling motion while the ratchet wheel 24 is prevented from reverse rotation by the detent pawl 30. The swing handle 21 is then again moved in the closing direction toward the stationary handle 19 to further close the second cutting edge 10 relative to the first cutting edge 2 in the same manner as described above, whereby the first and second cutting edges cut further into the workpiece in an amount corresponding to the amount of movement of the second cutting edge 10.

The swinging or pumping movement of the swing handle 21 in the rage of an angle through which the operator can easily swing the swing handle 21 back and forth will cause the driving pawl 27 to intermittently and incrementally rotate the ratchet wheel 24, thereby performing the cutting operation. A guide channel 3 defined between a retainer flange 4 fixed to the distal end of the first curved jaw 1 with bolts 5 and the first curved jaw 1 is adapted to receive the distal end portion of the second curved jaw 9 as the second curved jaw 9 is moved toward the first curved jaw 1.

As will be noted from the foregoing description, with the cable cutter according to the present invention, the first and second cutting edges can be opened to apply them to the workpiece with a small force required only to turn the knob after the swing handle has been opened beyond a predetermined angle away from the stationary handle to dislodge the driving pawl from engagement with the ratchet wheel. In addition, the opening operation is very easy without producing a noise because it is effected by engagement between the pinion and the gear teeth of the movable cutter blade.

The cutting operation effected on a workpiece to be cut after the workpiece has been clamped between the cutting edges is also very easy without requiring a large force because it can be accomplished by relative swinging movement of the handles within a relatively small angle therebetween in a posture convenient for the operator to apply his arm force. Further, the force transmission mechanism, which comprises a gear train, is not susceptible to deformation, twisting and/or looseness, and is robust in construction and precise in operation.

It is to be appreciated that extremely great cutting power is produced by a manual operation as a mechanical advantage is obtained in direct proportion to the product of the gear ratio between the ratchet wheel and the pinion and the reduction ratio between the pinion and the gear teeth of the movable cutter blade, so that the present invention provides a universal cable cutter.

Although the present invention has been described with respect to one preferred embodiment, this is by no means limitative. From the above discussion, may variations will be apparent to those skilled in the art that would yet be encompassed by the spirit and scope of the invention. For example, the gear teeth are not necessarily be formed integrally around the periphery of the movable cutter blade. Optionally, a separate gear or a sector gear may be affixed to the cutter blade. The driving pawl and detent pawl may be arranged independently of or in unison with each other so that they are moved out of engagement with the ratchet wheel by any suitable means rather than by spreading the swing handle beyond a predetermined angle.

What is claimed is:

1. A hand-operated cable cutter comprising:
   a first stationary cutter blade having a first curved jaw which is formed along its one lateral side with a first cutting edge;
   a second movable cutter blade having a second curved jaw which is formed along its one lateral side with a second cutting edge in an opposing relation with said first cutting edge, said movable cutter blade being pivotally connected to said stationary cutter blade for swinging and sliding movement relative to said stationary cutter blade;
   gear teeth provided on said movable cutter blade;
   a drive mechanism including a small gear kept in engagement with said gear teeth, a large ratchet wheel mounted concentrically with and for rotation with said small gear, a knob connected to said small gear, a driving pawl held engageable with said ratchet wheel to rotate said ratchet wheel in one direction, and a detent pawl kept in engagement with said ratchet wheel to prevent rotation of said ratchet wheel in the opposite direction;
   a first stationary handle having a distal end portion to which said stationary cutter blade is secured; and
   a second swing handle having a distal end portion mounted pivotally relative to said first cutter blade and stationary handle, with said driving pawl pivotally connected thereto so that pumping strokes of said swing handle relative to said stationary handle cause said driving pawl to rotate said ratchet wheel and hence said small gear in said one direction to thereby close said second cutting edge relative to said first cutting edge for performing the cutting operation on a workpiece to be cut and, when said driving pawl and detent pawl are disengaged from said ratchet wheel, free rotation of said ratchet wheel and small gear being permitted to allow said second cutting edge to be moved either away from or toward said first cutting edge by the use of said knob.

2. A hand-operated cable cutter according to claim 1, wherein said driving pawl and detent pawl are pivotally mounted and resiliently biased into engagement with said ratchet wheel.

3. A hand-operated cable cutter according to claim 2, wherein said driving pawl is adapted to be disengaged from said ratchet wheel when said second swing handle is opened wide beyond a predetermined angle relative to the first stationary handle.

4. A hand-operated cable cutter according to claim 3, wherein while said swing handle is opened beyond said predetermined angle to disengage said driving pawl from said ratchet wheel, said detent pawl is also disengaged from said ratchet wheel by an action of said distal end portion of said swing handle.

5. A hand-operated cable cutter according to claim 1, wherein said second cutter blade has an arcuate peripheral surface, said gear teeth being formed around at least a portion of said arcuate peripheral surface to define a sector gear.

6. A hand-operated cable cutter according to claim 1, further comprising a retainer flange fixed to the distal end of said first jaw to define in cooperation with said first jaw a guide channel for receiving the distal end portion of said second jaw as said second jaw is moved toward said first jaw.

7. A hand-operated cable cutter according to claim 1, wherein a mounting plate having a distal end and a proximal end secured respectively to the proximal end portion of said first cutter blade and to the distal end portion of said stationary handle is provided, and said small gear, ratchet wheel and detent pawl are mounted on said mounting plate.

8. A hand-operated cable cutter according to claim 6, further comprising a cover plate disposed in a spaced-apart and facing relation with said mounting plate to cover said drive mechanism, said cover plate being secured to said mounting plate and the distal end portion of said stationary handle.

9. A hand-operated cable cutter according to claim 1, further comprising a stop member secured to said stationary handle for limiting the movement of said swing handle to protect the operator's hands from being injured.

* * * * *